United States Patent
Hickox

(10) Patent No.: US 8,824,123 B2
(45) Date of Patent: Sep. 2, 2014

(54) ANIMAL DETERRENT DEVICE FOR ELECTRICAL CHARGING SYSTEM

(75) Inventor: Jeffrey M. Hickox, Middlefield, OH (US)

(73) Assignee: Delphi Technologies, Inc., Troy, MI (US)

( * ) Notice: Subject to any disclaimer, the term of this patent is extended or adjusted under 35 U.S.C. 154(b) by 228 days.

(21) Appl. No.: 13/552,730

(22) Filed: Jul. 19, 2012

(65) Prior Publication Data

US 2013/0033797 A1 Feb. 7, 2013

Related U.S. Application Data

(60) Provisional application No. 61/515,864, filed on Aug. 6, 2011.

(51) Int. Cl.
*H02B 1/00* (2006.01)

(52) U.S. Cl.
USPC ............ 361/600; 340/573.2; 340/573.3

(58) Field of Classification Search
None
See application file for complete search history.

(56) References Cited

U.S. PATENT DOCUMENTS

| | | | | |
|---|---|---|---|---|
| 4,969,418 A * | 11/1990 | Jones | ............ | 119/712 |
| 5,451,239 A * | 9/1995 | Sewell et al. | ............ | 47/1.01 R |
| 5,488,981 A * | 2/1996 | Burkhart | ............ | 150/166 |
| 5,894,818 A * | 4/1999 | Betzen | ............ | 119/712 |
| 6,809,265 B1 | 10/2004 | Gladd et al. | | |
| 7,249,436 B2 * | 7/2007 | Ravenelle et al. | ............ | 43/98 |
| 7,299,586 B2 * | 11/2007 | Lawson, Jr. | ............ | 43/98 |
| 7,834,769 B2 * | 11/2010 | Hinkle et al. | ............ | 340/573.3 |
| 8,666,471 B2 * | 3/2014 | Rogers et al. | ............ | 600/377 |

FOREIGN PATENT DOCUMENTS

| GB | 2303040 A | 12/1997 |
|---|---|---|
| WO | 0078137 A1 | 12/2000 |

* cited by examiner

*Primary Examiner* — Boris Chervinsky
(74) *Attorney, Agent, or Firm* — Robert J. Myers

(57) ABSTRACT

An animal deterrent device (ADD) includes a non-yielding base containing an array of animal deterring elements extending outwardly away therefrom. The base of the ADD is configured for deployment on at least one external surface of a transducer associated with a electrical charging system (ECS) used to electrically charge an energy storage device (ESD) on a vehicle. An array of animal deterring elements are respectively spaced apart a sufficient distance one-to-another and have respective heights so as to fill a space so that animals, such as a dog or a cat, are discouraged from residing on, or adjacent to at least one external surface of the transducer when the transducer that includes the ADD is disposed within a ground clearance of the vehicle. A method of using the ADD is also presented that includes a step of the ADD being formed in a mold in a single molding operation.

11 Claims, 6 Drawing Sheets

ANIMAL DETERRENT DEVICE FOR ELECTRICAL CHARGING SYSTEM

RELATED DOCUMENTS

This application claims priority to provisional application U.S. Ser. No. 61/515,864 filed on 6 Aug. 2011.

TECHNICAL FIELD

The invention generally relates to a device that deters animals, more particularly, an animal deterrent device (ADD) prevents animals from entering a space disposed intermediate a pair of spaced apart transducers associated with a vehicular electrical charging system (ECS) used to electrically charge an energy storage device (ESD) disposed on the vehicle.

BACKGROUND OF INVENTION

Wireless energy transfer systems are known to incorporate a first resonator structure (source resonator), or transducer that includes a coil configured for transferring magnetic energy and a spaced apart second resonator structure (capture resonator), or transducer that also includes a coil configured for receiving the wirelessly transmitted magnetic energy. Such a wireless energy transfer system may be used for electrically charging an energy storage device, or battery of an electric or hybrid vehicle. In such a system, the first transducer may be located on a ground surface, such as on a floor of a garage or a surface of a parking lot, and the second transducer may be disposed on a vehicle.

During operation of such a wireless energy transfer system, the vehicle to be electrically charged is parked so that the second transducer is generally aligned above the first transducer. The transducers may be separated by a distance that approximates a ground clearance of the vehicle which is a typical clearance between the bottom portion of the vehicle's chassis and a ground surface. In some vehicle applications, the ground clearance may be in a range from about 10 centimeters (cm) to 20 cm. In such an arrangement, this ground clearance space between the transducers is large enough to provide room for small animals, such as dogs and cats, and other objects, such as aluminum soda cans to reside. It is desirable to keep such animals and foreign objects out of this space between the aligned transducers during operation of the wireless energy transfer system, so as, for example, to enable maximum energy transfer efficiency from the first transducer to the second transducer to be attained.

Thus, a robustly constructed animal deterrent device (ADD) that prevents animals and small objects from entering this space intermediate the transducers to enable maximum energy transfer efficiency is needed.

SUMMARY OF THE INVENTION

In accordance with one embodiment of the invention, an animal deterrent device (ADD) includes a generally non-yielding base that includes an array of animal deterring elements extending outwardly away therefrom.

In accordance with another embodiment of the invention, an ADD is suitable for placement on at least one external surface of a transducer that is configured to be fixedly attached to a ground surface. The transducer is associated with an electrical charging system (ECS) and the ECS is configured to electrically charge an energy storage device (ESD) disposed on a vehicle. The ADD includes a base and a plurality of animal deterring elements that extend from the base that are disposed sufficiently close together to discourage animals, such as cats and dogs from residing on, or adjacent to the transducer, especially during operation of the transducer.

A method is also presented for using an animal deterrent device (ADD) that includes a step of providing the ADD in which the ADD includes a uniform, non-yielding base that contains an array of animal determining elements extending outwardly therefrom. Another step in the method includes attaching the ADD to an apparatus in a manner such that the array of animal deterring elements extend outwardly away therefrom. The providing step may include a substep of molding the ADD in a mold so that the ADD is formed as a single unitary piece in a single mold operation.

Further features, uses and advantages of the invention will appear more clearly on a reading of the following detailed description of the embodiments of the invention, which are given by way of non-limiting example only and with reference to the accompanying drawings.

BRIEF DESCRIPTION OF THE DRAWINGS

This invention will be further described with reference to the accompanying drawings in which.

DETAILED DESCRIPTION OF THE EMBODIMENTS OF THE INVENTION

A transducer, during operation, may transmit magnetic energy to another transducer that receives the transmitted energy. In some embodiments, the transducers are configured to transfer energy to the vehicle at a sufficiently high rate which may require a respective physical size of the transducers to be approximately 0.5 meters (m) in length by 0.5 meters (m) in width by 3 centimeters (cm) in height. Alternately, the transducers may be constructed to wirelessly transmit/receive inductive energy or electrical energy. If the transducer is disposed on a ground surface and the transmitting transducer remains in operation, heat is generated within the transducer that may entice an animal, like a dog or cat, to reside on top of, or adjacent a housing of the ground-based transducer so that the dog or the cat may absorbingly enjoy the warmth of the emitted heat. For example, if the dog or the cat decides to reside on top of the warmed transducer, the animal may also further be susceptible to high power magnetic energy during operation of the transducer. Thus, the transmission of magnetic energy through an animal during operation of the transducer may negatively affect the animal's health in addition to negatively affecting maximum energy transfer efficiency between the transducers. Transducers that do not have maximum energy transfer may result in an electrical charging system that undesirably electrically charges a battery in a longer time period that may have an increased associated energy cost to a human operator of the electrical charging system.

Figure 1:
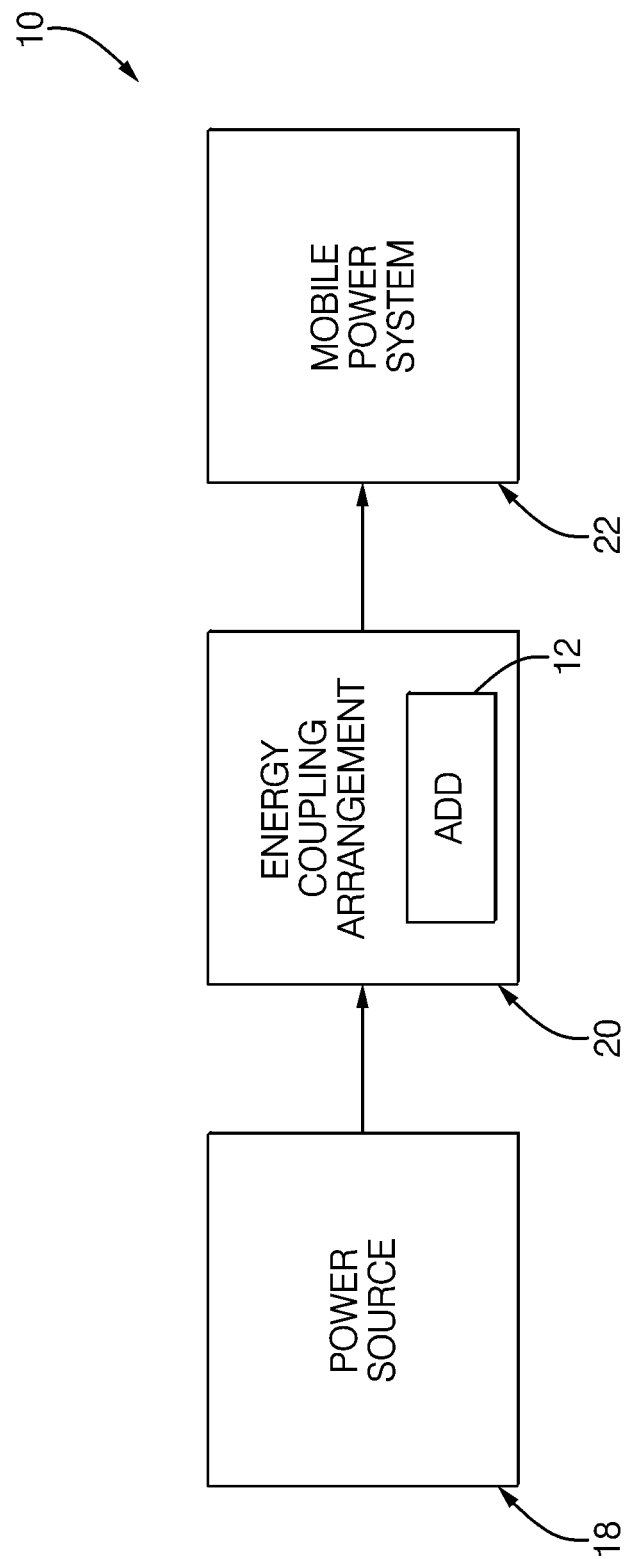
FIG. 1 shows a block diagram of an electrical charging system (ECS) that includes an animal deterrent device (ADD) associated with an energy coupling arrangement, according to the invention.
Figure 2:
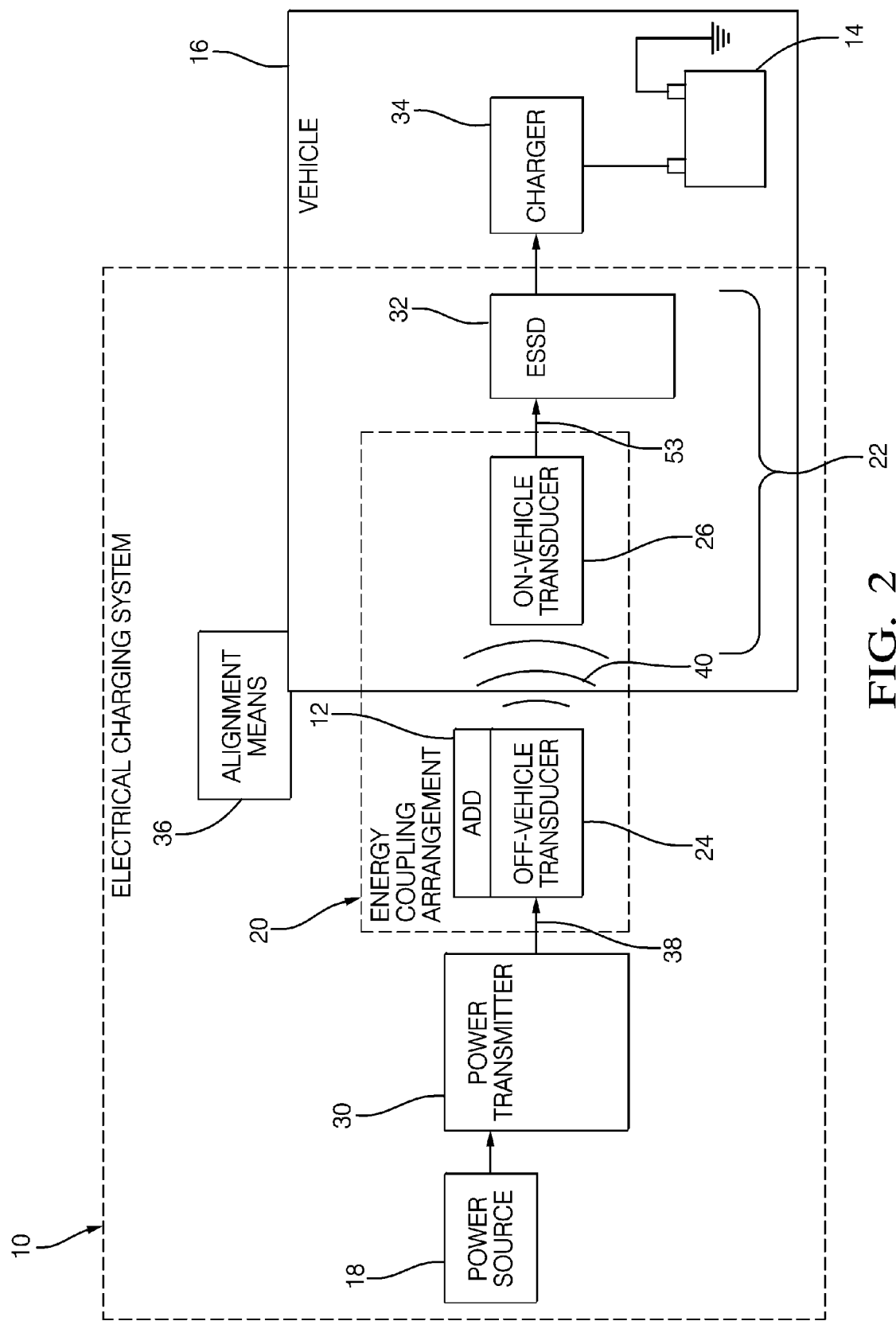
FIG. 2 shows a more detailed block diagram of the ECS of FIG. 1 in which the ECS further contains an electrical signal shaping device (ESSD)
Figure 3:
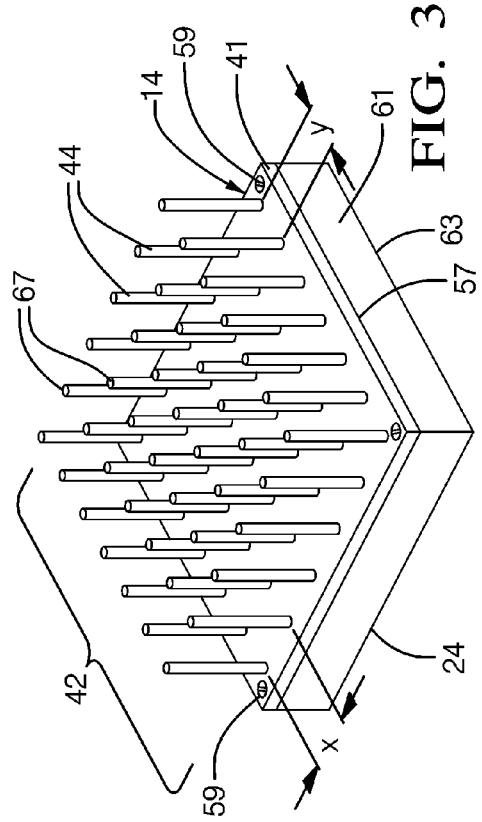
FIG. 3 shows an isometric view of the off-vehicle transducer of the ECS of FIG. 2 in which the ADD is deployed on a top external surface thereon.

Referring to FIGS. 1-3, then, an electrical charging system (ECS) 10 contains an animal deterrent device (ADD) 12 that advantageously discourages an animal (not shown) from being located on or adjacent a portion of ECS 10, especially during operation of the ECS 10. ECS 10 is used to electrically charge an electrical storage device (ESD), or battery 14 disposed on a vehicle 16. ECS 10 is formed of electrical circuit components, such as resistors, capacitors, inductors, invertors, switches, relays, transistors, and the like. Battery 14 may include a plurality of batteries that often are associated with electrically charging a hybrid or electric vehicle that assist to power a drivetrain of such vehicles. ECS 10 includes an energy coupling arrangement 20 and a mobile power system 22. A portion of energy coupling arrangement 20 and mobile power system 22 of ECS 10 are respectively disposed on vehicle 16. Another portion of energy coupling arrangement 20 is disposed external to vehicle 16 and configured to communicate with a power source 18. Energy coupling arrangement 20 includes a first apparatus, or off-vehicle transducer 24 and a second apparatus, or on-vehicle transducer 26 which is configured to receive magnetic energy wirelessly magnetically transmitted by off-vehicle transducer 24 to electrically charge battery 14. Off-vehicle transducer 24 is disposed external to vehicle 16 and on-vehicle transducer 26 is disposed on vehicle 16. For example, ADD 12 may be purchased by consumers of ECS 10 that are pet owners, or alternately, the ADD may be included as part of the ECS system when the ECS system is purchased by consumers.

Referring to FIG. 2, off-vehicle transducer 24 is configured for fixed, secure attachment to a ground surface 28. Off-vehicle transducer 24 may be fixedly secured to ground surface 28 using fasteners such as concrete screws or bolts as is known in the fastening arts. Still alternately, the off-vehicle transducer may be secured to the ground surface using adhesive. When off-vehicle transducer 24 is secured to ground surface 28, secured off-vehicle transducer may be referred to herein as a ground-based transducer. Off-vehicle transducer 24 includes a housing 61 and ADD 12 is configured for fixed attachment to housing 61. Preferably, housing 61 of off-vehicle transducer 24 is formed of a dielectric material, preferably plastic. The use of plastic material may further allow for optimal transmission of the magnetic energy out of the transducer. A top portion of the housing formed from a metal material may undesirably affect the magnetic transmission to the on-vehicle transducer. Alternately, the transducer housing may be formed of a plastic and a metal material with the metal material being adjacent the ground surface remote from the secured ADD. The magnetic energy is generally transmitted up through the upper plastic portion of housing 61 towards on-vehicle transducer 26. The metal portion of the housing may provide an acceptable electrical ground plane for the off-vehicle transducer. When ADD 12 is attached to housing 61, ADD 12 discourages an animal (not shown) from residing on housing 61 of ground-based transducer 24 where ADD 12 is coveringly deployed. More particularly, ADD 12 is provided to be an effective animal deterrent when at least a portion of vehicle 16 overlies ADD 12 attached to ground-based transducer 24. When the animal does not overlie or is not adjacently disposed against housing 61, this may assist to ensure maximum energy transfer efficiency between transducers 24, 26 during operation of ECS 10. The animal may also be less susceptible to exposure to transmitted magnetic energy configured to emit from ground-based transducer 24. If the animal is located at a remote point disposed at an increased distance in a direction moving away from ground-based transducer 24 during operation of ground-based transducer 24, the animal's exposure to transmitted magnetic energy may also be subsequently lessened. Power source 18 provides power to off-vehicle transducer 24 of energy coupling arrangement 20. For example, the power source may operate on AC voltage (VAC) and the AC voltage may be greater than 120 VAC. Power source 18 and ground-based transducer 24 that includes ADD 12 are each respectively disposed external to vehicle 16. ADD 12 may be secured to off-vehicle transducer 24 by a human operator of ECS 10. Likewise, off-vehicle transducer 24 may also be secured to ground surface 28 by the human operator.

ECS 10 further includes a power transmitter 30 and an electrical signal shaping device (ESSD) 32. Power transmitter 30 is disposed intermediate to, and in electrical communication with power source 18 and energy coupling arrangement 20. An output 53 of energy coupling arrangement 20 is in downstream electrical communication with ESSD 32. Power transmitter 30 is configured for electrical communication with power source 18 and off-vehicle transducer 24 that includes ADD 12. Off-vehicle transducer 24 is configured for operation when power transmitter 30 is electrically connected with power source 18. Power transmitter 30 supplies the necessary power via a voltage or a current electrical signal 38 to ground-based transducer 24 so that ground-based transducer 24 is configured to wirelessly transmit magnetic energy 40 to on-vehicle transducer 26. On-vehicle transducer 26 receives the wirelessly transmitted magnetic energy 40 and converts the received magnetic energy to electrical energy which is further transmitted and electrically shaped by ESSD 32 and subsequently used to electrically charge battery 14. Alternately, the power transmitter may supply an electrical signal to operate the ground-based transducer that is a combination of both voltage and current. A vehicular charger 34, which is further controllable by vehicle 16, receives an output electrical signal from ESSD 32. Vehicular charger 34 also produces an output electrical signal that is in downstream electrical communication with battery 14. Electronic devices disposed in vehicle 16 may further decide to allow or prevent electrical charging of battery 14 by further controlling operation of vehicle charger 34. For example, the vehicular electronic devices may have information that indicates the battery is at a full state of electrical charge and communicate with the vehicular charger so as to not allow further electrical charging of the battery independent of ECS operation. On-vehicle transducer 26, ESSD 32, and vehicular charger 34 are respectively disposed on vehicle 16. Power transmitter 30, in addition to power source 18 and ADD 12 attached to off-vehicle transducer 24 as previously described herein, are disposed external to vehicle 16. In one embodiment, the ESSD may include a controller/rectifier in electrical communication with an inverter in which the transfer switch is in downstream electrical communication from the invertor. This type of configuration along with other ESSD configurations are further described in U.S. Ser. No. 13/450,881 entitled "ELECTRICAL CHARGING SYSTEM HAVING ENERGY COUPLING ARRANGEMENT FOR WIRELESS ENERGY TRANSMISSION THEREBETWEEN" filed on 19 Apr. 2012 which is incorporated by reference in its entirety herein. ECS 10 further includes an alignment means 36 that facilitates the positioning of vehicle 16 so that alignment of on-vehicle transducer 26 and ground-based transducer 24 that includes ADD 12 occurs so that battery 14 may be electrically charged. The ECS that includes the ADD may also incorporate other features that further enhance the safety of the human operator of the ECS. One such ECS system is further described in U.S. Ser. No. 13/306,327 entitled "POWER SAFETY SYSTEM AND METHOD HAVING A PLURALITY OF THERMALLY-TRIGGERED ELECTRICAL BREAKING ARRANGEMENTS" filed on 29 Nov. 2011 which is also incorporated by reference in its entirety herein.

Turning our attention now to FIG. 3, a more detailed view of off-vehicle transducer 24 that includes ADD 12 is illustrated. ADD 12 is separately distinct from off-vehicle transducer 24 prior to deployment on off-vehicle transducer 24. ADD 12 is deployable onto a first, or top external surface 57 of off-vehicle transducer 24. Planar, top external surface 57 is generally parallel with and opposingly remote to a second, or bottom external surface 63 and ground surface 28 when off-vehicle transducer 24 is secured thereto. In other words, top external surface 57 faces away from ground surface 28 of ground-based transducer 24. Bottom external surface 63 is adjacent ground surface 28 when off-vehicle transducer 24 is fixedly secured to ground surface 28. When ADD 12 is deployed on top external surface 57 of off-vehicle transducer 24, an ADD/transducer assembly is formed. ADD 12 includes a uniform, generally non-flexible, non-yielding, planar base 41 adapted for placement on the planar top external surface 57. Alternately, the top external surface of the off-vehicle transducer may be non-planar, such that, for example, it may have an arcuate, concave external surface. The base of the ADD then may be constructed to conform to generally shapingly fit the non-planar top external surface of the off-vehicle transducer. Base 41 is dimensioned large enough to coveringly overlie top external surface 57. Base 41 is placed on top external surface 57 so that an array of animal deterring elements 42 extendingly protrude outwardly away from base 41. When ADD 12 is disposed on top external surface 57, animal deterring elements 42 extrudingly protrude outwardly away from top external surface 57. Array 42 is also dimensioned large enough to spread across a majority portion of base 41 so as to be effective to deter animals from overlying across top external surface 57. Base 41 defines through holes so that ADD 12 is attachably secured to off-vehicle transducer 24 by fasteners 59 received in the through holes. The fasteners may include screws, nuts and bolts, rivets, and the like. Alternately, the base of the ADD may be secured to the top external surface using an adhesive. When off-transducer 24 is secured on ground surface 28, top external surface 57 and base 41, respectively, are generally parallel with ground surface 28 and array of animal deterring elements 42 extend outwardly away from base 41 and top external surface 57 about transverse with ground surface 28. Alternately, the posts in the array may have a small angular disposition that differs from the perpendicular position.

Array of animal deterring elements 42 are extending cylindrical pins, or posts 44. Posts 44 generally extend in a direction perpendicular to base 41. Posts 41 are formed of uniform, solid material throughout. Preferably, posts 44 and base 41 are formed of the same material. Alternately, the posts may be hollowed out to advantageously allow less material to be used to fabricate the ADD while also reducing manufacturing material costs. Each post 44 has a circular, column form. Alternately, the posts may have a tapered shape becoming narrower as the post extends further remotely away from the base of the ADD. Having tapered posts is advantageous when molding the ADD to facilitate removal of the ADD from the mold. Each post 44 includes an end 67 having a spaced relationship to base 41. In a one embodiment, each post may have a 7 millimeter (mm) thickness adjacent the base which linearly tapers to a 4 mm thickness at the end. Each post 44 does not make physical contact with any other adjacent post 44 in the array of animal deterring elements 42. Optimally selecting the x-direction and y-direction distance between each post in the array may allow for less material to be used to fabricate the ADD while decreasing fabrication costs. Additionally, posts spaced far enough apart allow for easier periodic cleaning of the ADD especially the base of the ADD by a human operator of the ECS. Array 42 is a 6 by 7 deterring element array with the 7 elements in the array being proximate a left facing side wall 25 of off-vehicle transducer 24. Alternately, the size of the array may be any size as necessary to fit the size or shape of the top external surface. The non-contacting posts 44 are spaced apart by a distance in an x-direction and a distance in a y-direction. The y-direction distance is transverse to the x-direction distance and the x-direction distance and y-direction distance are generally parallel to ground surface 28. The distances of the x-direction and the y-direction are selected to prevent an animal from squeezing within the spaces in-between the posts in the array.

The x-direction distance and the y-direction distance are selected based upon the physical size of an animal's head and/or portions of the animal's body that is desired for deterrence from overlying the off-vehicle transducer or in-between the adjacent posts. Generally, an animal that cannot fit a head through the posts will not also attempt to fit the torso or the remainder of the body also in-between the posts. Preferably, the x-direction distance and the y-direction distance are respectively sized to keep out the head of a small cat from fitting in-between adjacent posts in the array of animal deterring elements. Even more preferably, it has been observed that the x-direction distance and the y-direction distance should be about the same distance. It has been also been observed that the x-direction distance and the y-direction distance that is effective to deter animals, especially dogs and cats, may be in a range from about 4 centimeters to about 7 centimeters (cm). For example, a 5 cm spacing of each post in the array in both the x-direction and the y-direction may provide sufficient inter-post spacing to keep a small cat's head and/or body and/or torso from residingly overlying the transducer and from fitting in-between the posts. In an alternate embodiment, tapered posts may also have a 5 cm spacing in both the x-direction and the y-direction as measured between the posts adjacent the base of the ADD.

ADD 12 is formed of a dielectric material. Preferably, the ADD is formed of a plastic material, such as nylon or a thermoplastic. Alternately, the ADD and the top portion of the housing of the off-vehicle transducer may be formed from the same material. Even more preferably, the base and the array of animal deterring elements are formed from the same dielectric material. Posts 44 are configured to have a sufficient amount of stiffness, or rigidity to provide column strength for posts 44 to project outwardly upward from base 41 and to prevent at least the ingress of animals thereto while also having a sufficient amount of flexibility and resilience to resist breakage under normal operation. For example, breakage of at least the animal deterring elements of the ADD may occur if at least a portion of human body weight or a portion of the vehicle's mass is applied against the posts of the ADD.

Figure 4:
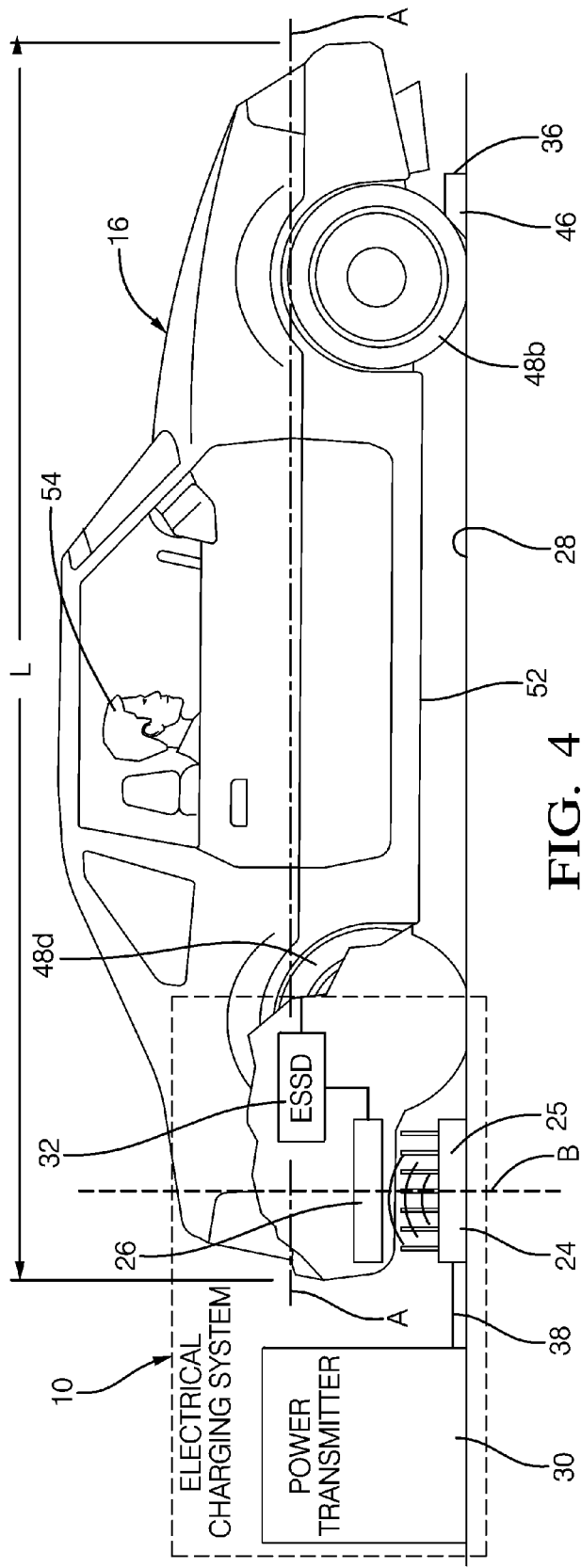
FIG. 4 shows a side view of the ECS of FIG. 2 in which the on-vehicle transducer is aligned to overlie the ADD/off-vehicle transducer of FIG. 3.
Figure 5:
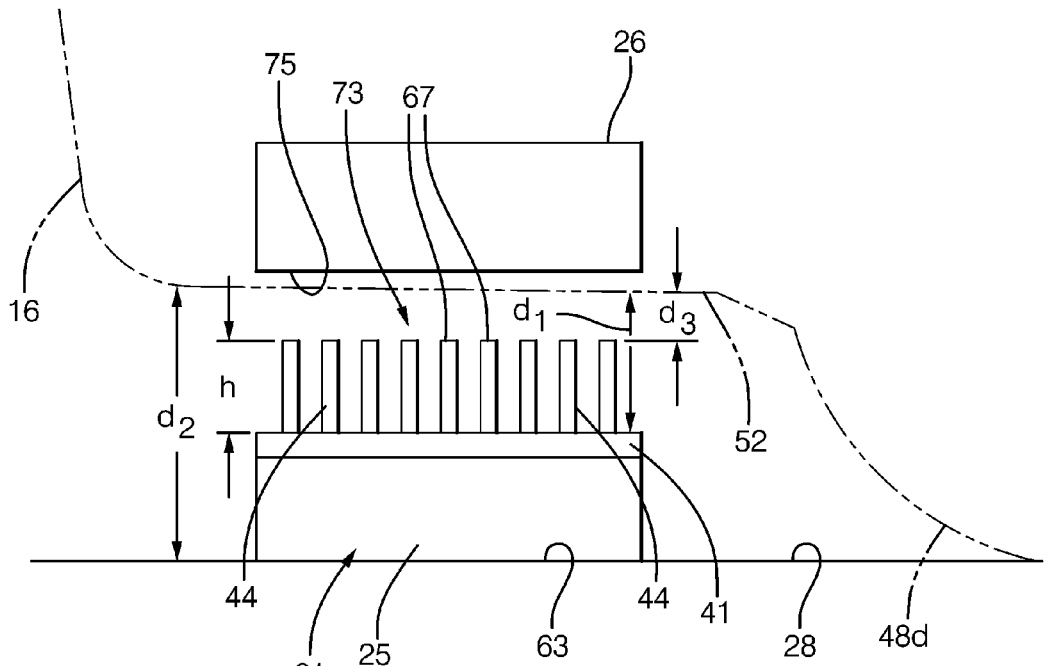
FIG. 5 shows a magnified view of the relationship between the ADD/off-vehicle transducer and the on-vehicle transducer of the ECS of FIG. 4, and details thereof.

Referring to FIGS. 3-5, the relationship of ground-based transducer 24 that includes ADD 12 and on-vehicle transducer 26 is better illustrated. A length L of vehicle 16 is disposed along a longitudinal axis A. Vehicle 16 is positioned, so that when parked, on-vehicle transducer 26 has a spaced relationship with, and substantially axially overlies ground-based transducer 24 along a longitudinal axis B. Axis B is disposed so as to be transverse to axis A. Referring to FIG. 5, vertical distances $d_1$, $d_2$, $d_3$, and a height h of posts 44 are illustrated. Distances $d_1$, $d_2$, $d_3$, and a height h are all axial distances in relation to axis B. Distance $d_2$ is a greater distance than distances $d_1$, $d_3$ and height h, respectively. Distance $d_1$ is a distance from base 41 of ADD 12 to chassis, or undercarriage 52 of vehicle 16. Distance $d_2$ is a distance from ground surface 28 to undercarriage 52 and distance $d_3$ is from ends 67 of posts 41 to undercarriage 52. Distance $d_3$ identifies a volumetric space 73 intermediate undercarriage 52 and ends 67 of posts 44 of ADD 12. Height h is measured from base 41 to ends 67 of posts 44 of array 42. Preferably, height h is the same height for every post 44 in array 42. Distance $d_2$ generally defines a ground clearance space intermediate undercarriage 52 and a generally planar ground surface 28. The ground clearance space is about the same distance $d_2$ along length L of vehicle 16, as best illustrated in FIG. 4. Another definition for ground clearance may be the amount of space between the lower most hanging part of the vehicle's undercarriage and the flat ground surface. ADD 12 is effective to keep animals out of space 73 when undercarriage 52 overlies ADD 12 disposed on off-vehicle transducer 24, especially when on-vehicle transducer 26 directly overlies off-vehicle transducer 24. ADD 12 is also effective to keep animals from being disposed in the spaces disposed in-between posts 44 of array 42 within height h across base 41 along top external surface 57. A height of the off-vehicle transducer may also need to be taken into consideration for the correct sizing of the height of the animal deterring elements in any application of use for the ADD. In some other alternate embodiments, a lower surface of the on-vehicle transducer may hang below a lower surface of the undercarriage so as to have a distance from the ground surface that may be less than $d_2$. In this type of application, the animal deterring elements of the ADD are sized to ensure that when at least a portion of the transducers overlie one another animals are prevented from at least entering this space in-between the transducers.

On-vehicle transducer 26 is mounted on vehicle 16 in a manner so that a planer external surface 75 of on-vehicle transducer 26 is at least level with a lower external surface of undercarriage 52. Alternately, the external surface of the on-vehicle may be non-planar. The lower surface of the undercarriage is that surface that is located closest to the ground surface generally along length L of vehicle 16. Alternately, on-vehicle transducer 26 may be recessed within undercarriage 52 so that the lower external surface of the on-vehicle transducer may be disposed at a distance greater than distance $d_2$. The distances in the x-direction and the y-direction of the posts of the ADD are disposed about, and perpendicular to axis B. As best illustrated in FIG. 4, vehicle 16 is positioned by a human driver 54 so that on-vehicle transducer 26 substantially axially overlies ground-based transducer 24 along axis B. Driver 54 uses alignment means 36 which includes a wheel chock 46 to assist at arriving of the correct positioning of vehicle to ensure substantial alignment of transducers 24, 26. Wheel chock 46 is positioned so that tire 48*b* of vehicle 16 engages wheel chock 46. Alternately, a wheel chock may be used at one or more of the tires 48*a*, 48*b*, 48*c*, 48*d* of vehicle 16. Wheel chock 46 may be formed from any type of solid material such as plastic, wood, or metal. For example, the wheel chock may be commercially available for purchase at an auto supply store. In many embodiments, the human driver may also be the human operator that governs operation of the ECS. Still alternately, the off-vehicle transducer may not completely underlie the off-vehicle transducer, yet still be effectively positioned one-to-another to communicate magnetic energy therebetween. In some other alternate embodiments, the off-vehicle transducer may not underlie the on-vehicle transducer, yet still underlie the undercarriage of the vehicle and yet still be effectively to transmit/receive magnetic energy one-to-another. Alternately, the driver may utilize other alignment techniques/technologies that allow for alignment of the transducers.

Height h of posts 44 along with x-direction and y-direction spacing of posts 44 need to be selected and fabricated dependent on the vehicle application of use so that animals are deterred from entering space 73 or other spaces defined in-between posts 44 within height h. When on-vehicle transducer 26 is mounted on vehicle 16, as illustrated in FIG. 5, with lower surface 75 being level with or recessed axially away from a lower surface of undercarriage 52, distance $d_3$ is maintained across length L of vehicle 16. Preferably, distance $d_3$ and the x-direction distance are about the same distance dimension and the y-direction distance is about the same distance dimension as the x-direction. This same distance relationship ensures that posts 44 of ADD 12 have sufficient height to advantageously deter animals from residing in space 73, especially the animal's head or at least a portion of the animal's body, or torso. In an alternate embodiment, if the on-vehicle transducer is attached to the undercarriage so as to protrudingly extend below the lower surface of the undercarriage along length L so that the lower external surface of the on-vehicle transducer is disposed closer to the ground surface, the height of the posts would need to be effectively sized in relation to the protruding on-vehicle transducer. As described above and also preferably in this alternate embodiment, the distance $d_3$ and the x-direction distance are about the same dimension and the y-direction distance is about the same as the x-direction distance. Again, this same distance relationship ensures if the on-vehicle transducer substantially overlies the off-vehicle transducer, at least the head and the body of the animal is prevented from being disposed in the space intermediate the ends of the posts and the on-vehicle transducer and the spaces defined in-between the posts. For example, distance $d_2$ may be in a range from about 10 cm to about 25 cm for a vehicle as previously described in the Background herein, and distance $d_3$ may be about 2 cm less than the $d_1$ distance. The appropriate height h for the posts, then, may be ascertained, or determined. It has been observed that $d_3$ being about 2 cm less than the selected $d_1$ distance may be sufficient clearance for the vehicle to be positioned so as to easily overlie the ADD, but small enough so that an animal would not gain access to the space intermediate the ADD and the on-vehicle transducer. Advantageously, the posts have sufficient height so as to effective fill the space intermediate the transducers 24, 26 yet remain obstructingly free from making contact with the undercarriage within the ground clearance of the vehicle during normal operation of the vehicle and the ADD. Alternately, trucks may require distance $d_2$ that has a range that is greater than 25 cm as trucks generally have an increased ground clearance in contrast to that of a vehicle.

ADD 12 is generally not being used in ECS 10 when ADD 12 is not attached to off-vehicle transducer 24. ADD 12, when attached with off-vehicle transducer 24, is generally not in use if off-vehicle transducer 24 is not secured to ground surface 28 and/or not in electrical connection with power transmitter 30.

Figure 6:
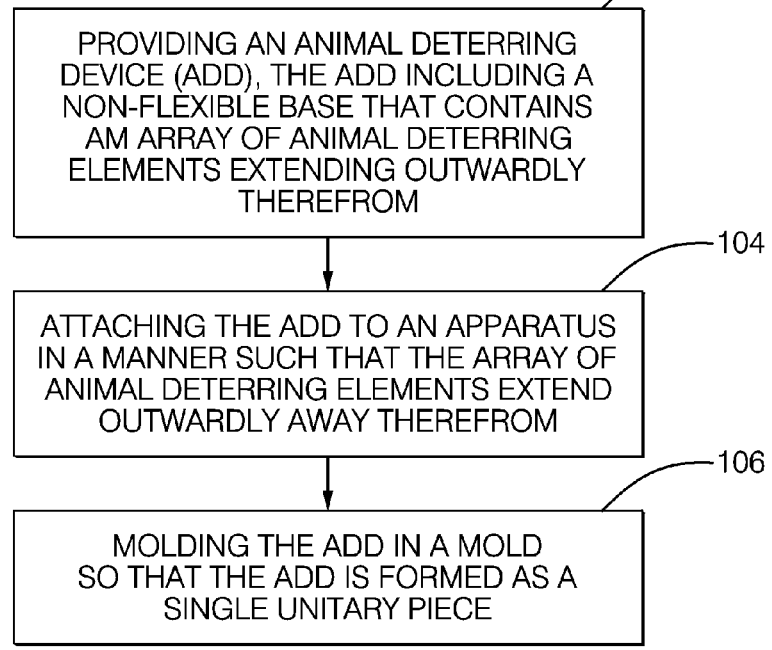
FIG. 6 shows a method of using the ADD associated with the ECS of FIG. 4.

Referring to FIG. 6, a method 100 more particularly captures when ADD 12 is being used in ECS 10. One step 102 in method 100 is providing ADD 12. ADD 12 includes uniform, non-yielding base 41 that contains array of animal deterring elements 42 extending outwardly therefrom. Another step 104 in method 100 is deploying ADD 12 on off-vehicle transducer 26 in a manner such that the array of animal deterring elements 42 extend outwardly away therefrom. While ADD 12 is now functional, ADD 12 is more useful once off-vehicle transducer is electrically connected to power transmitter 30 and power transmitter connected to power source 18. The ADD is best used to discourage animals especially when off-vehicle transducer is operational to transmit magnetic energy. Providing step 102 further includes step 106 of method 100 which is molding ADD 12 in a mold so that base 41 and array of animal deterring elements 42 are formed as a single unitary piece in a single mold operation in a manufacturing assembly process.

Figure 7:
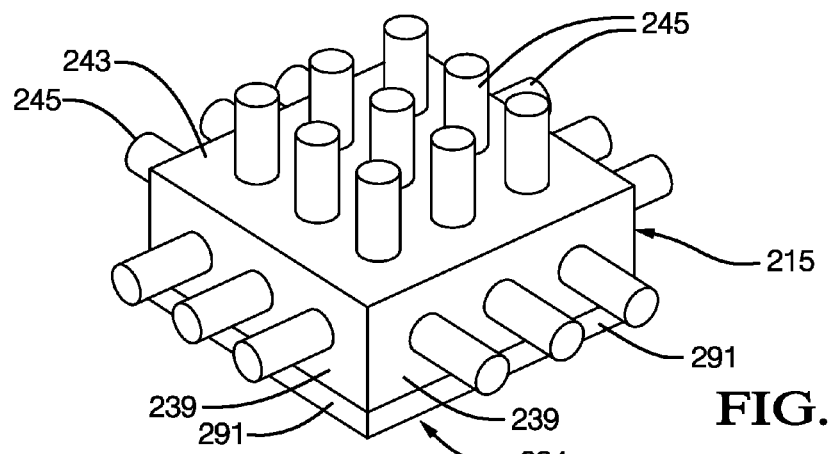
FIG. 7 shows an off-vehicle transducer containing an ADD that contains animal deterring elements disposed along a plurality of external surfaces of the off-vehicle transducer, according to an alternate embodiment of the invention.

Referring to FIG. 7, according to an alternate embodiment of the invention, an off-vehicle transducer 224 includes an ADD 215 that includes posts 245 disposed along external surfaces of a plurality of side walls 291 of off-vehicle transducer 224 in addition to the top external surface of off-vehicle transducer 224 as illustrated in the embodiment of FIG. 3 previously described herein. A base 243 of ADD 215 overlies the top external surface of off-vehicle transducer 224 and extendingly transitions to also overlie side walls 291 of off-vehicle transducer 224. Side walls 291 are disposed transverse to the top external surface of off-vehicle transducer 224 as are side walls 239 of base 243. Posts 245 are additionally disposed adjacent side walls 291 to further advantageously deter animals from adjacently lying along side walls 291. Thus, ADD 215 deters animals away from the top external surface in combination to side wall external surfaces of off-vehicle transducer 224. Similar to ADD 12 of the embodiment of FIG. 3, ADD 215 is also separately distinct from off-vehicle transducer 224 and may have all some or all of the features of ADD 12 previously described herein. For example, posts 245 and base 243 are preferably fabricated from the same plastic material. While posts 245 generally have the same length, the lengths of the posts along the side walls may alternately have a different length than the posts disposed along the top external surface which is dependent on the distance of animal deterrence desired adjacent side walls 291.

Figure 8:
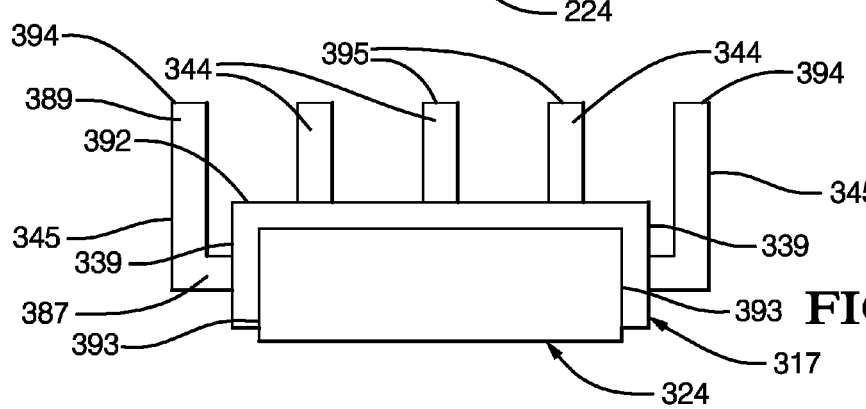
FIG. 8 shows an off-vehicle transducer containing yet another ADD containing animal deterrent elements having different shapes, according to another alternate embodiment of the invention.

Referring to FIG. 8, according to another alternate embodiment of the invention, an off-vehicle transducer 324 includes side walls 393. An ADD 317 includes a base 392 and posts 344, 345. Base 392 also has side walls 339 similar to the embodiment of FIG. 7 that extend downwardly across side walls 393. Posts 344 extend outwardly along a top, planar external surface of transducer 324 and have a first shape along base 392 similar to the posts 44 in the embodiment illustrated in FIG. 3. Posts 345 extend outwardly along external surfaces of side walls 393 and have a second shape different from the first shape in which the second shape is a right angle-type shape. One or more of the side walls 393 may contain the right-angled posts 345. The right angle shape of posts 345 have a first portion 387 that extends outwardly form side walls 339 of base 382 in a direction generally perpendicular to side walls 339 of base 392 and side wall 393 and a second portion 389 that extends from first portion 387 in a different direction from first portion 387. Ends 394 of right angle-shaped posts 345 are generally flush with ends 395 of posts 344. Right-angled posts 345 also advantageously serve to assist to deter animals from lying along side walls 393 of off-vehicle transducer 324.

Figure 9:
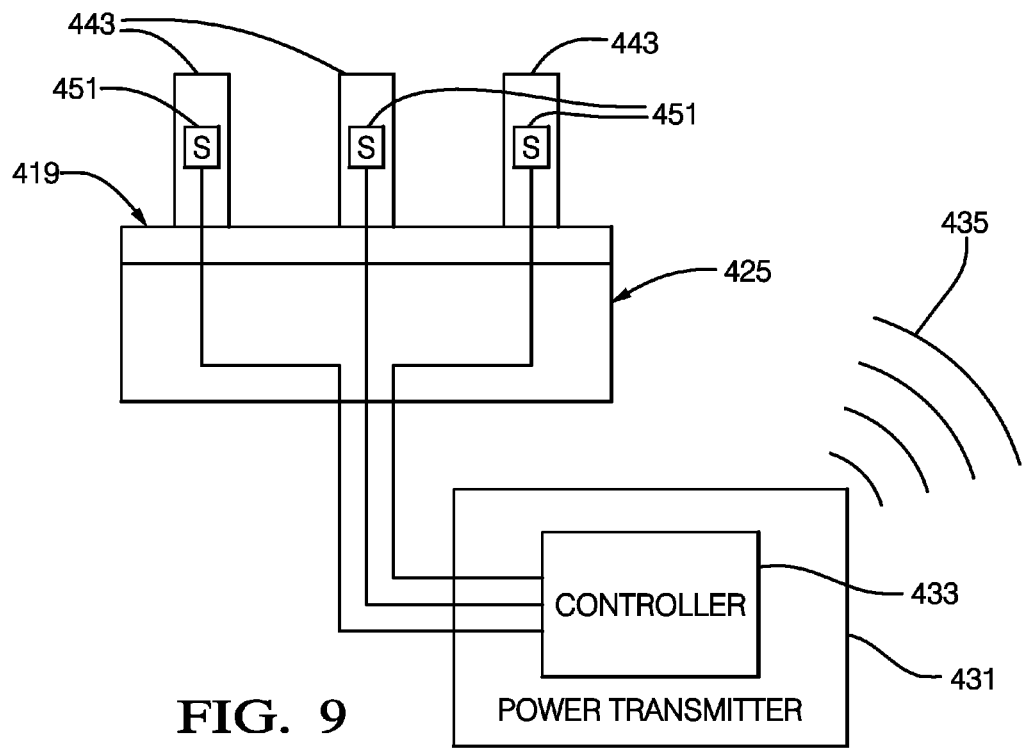
FIG. 9 shows an ADD/off-vehicle transducer having at least one sensor contained therein, according to a further alternate embodiment of the invention.

Referring to FIG. 9, according to a further alternate embodiment, at least one sensor 451 is in communication with animal deterring elements 443 of ADD 419. ADD 419 is attached to off-vehicle transducer 425. Posts 443 are hollowed out so as to fit sensors. Sensors 451 are in electrical communication with a controller 433 disposed in power transmitter 431. Power transmitter 431 may wirelessly communicate a status signal 435 to other circuit elements or electrical devices in the ECS or vehicle such that, if the sensors are activated by an animal that movingly disturbs or otherwise puts pressure on the posts, the ECS is configured to stop the ECS from electrically charging the battery.

Figure 10:
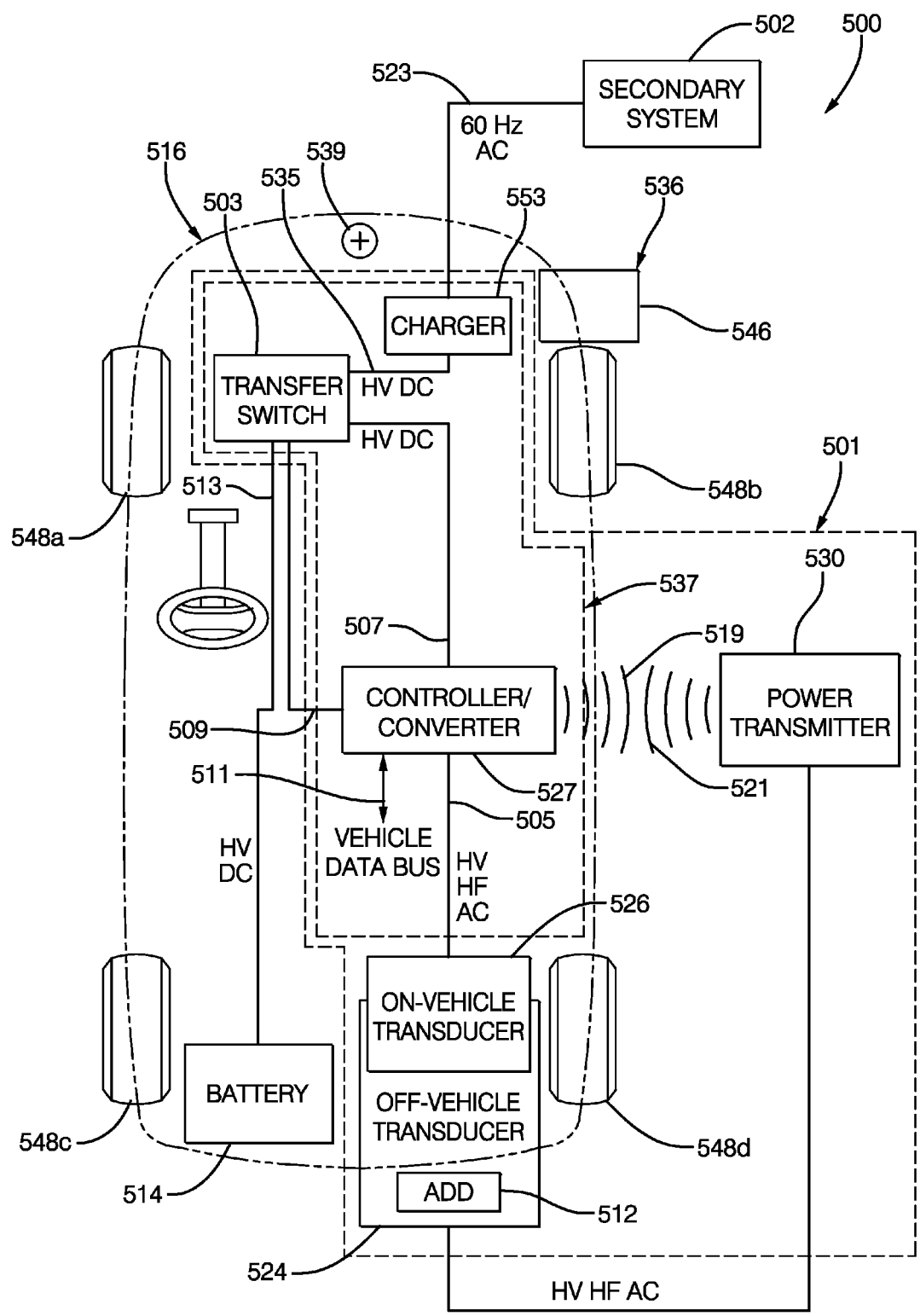
FIG. 10 shows an ECS to electrically charge an energy storage device (ESD) disposed on a vehicle that includes a primary ECS and a secondary ECS in which the primary ECS contains an ADD, according to yet another alternate embodiment of the invention.

Referring to FIG. 10, yet another embodiment of the invention an ECS 500 includes a primary ECS 501 and a secondary ECS 502. Primary ECS 501 is generally a high voltage, high frequency ECS and secondary ECS is generally a lower voltage, lower frequency ECS.

To better understand the electrical signals as designated on the electrical signal paths illustrated in FIG. 10, the following definitions apply:

60 Hz AC—A 60 Hz, AC voltage electrical signal. Generally, the AC voltage is either 120 VAC or 240 VAC dependent on the power source generating the voltage.

HV HF AC—A high voltage, high frequency alternating current (AC) electrical signal. Preferably, the voltage signal is greater than 120 VAC and the frequency of the voltage signal is greater than 60 Hz. The frequency may be in a range of 10 kHz to 450 kHz.

HV DC—A high voltage, direct current (DC) electrical signal. Preferably, the DC voltage is greater than 120 VDC.

Primary ECS 501 includes an ADD 512 that may have any of the advantageous features as previously described the embodiments herein. Similar elements in the embodiment of FIG. 10 as the embodiment of FIGS. 2 and 4 have reference numerals that differ by 500. In contrast to ECS 10, ECS 500 shows another type of electrical charging system configuration that includes primary ECS 501 which contains an ESSD 537 and an integrated charger 553 that is different from ESSD 32 and the vehicular charger of ECS 10 in the embodiment of FIG. 4. More particularly, ESSD 537 includes a controller/convertor 527. A transfer switch 503 is in downstream electrical communication from controller/converter 527 via electrical output 507. Transfer switch 503 is also in downstream electrical communication with integrated charger 553 via signal path 535. Transfer switch 503 is in direct electrical communication with battery 514 via electrical output 513. There is no wireless volt meter electrical device (not shown) or ballast resistor electrical device (not shown) or inverter electrical device (not shown) in contrast with ECS 10 in the embodiment of FIG. 4. The functionality of the wireless voltmeter is integrated in with the controller portion of controller/converter block 527. Thus, with ECS 500, primary ECS 501 is a more simplified ECS approach that may allow for greater ECS system power efficiency improvements. ECS 500 may also allow for a more precise control in the electrical charging of battery 514. Alternately, the controller portion of the controller/convertor may electrically communicate with the integrated charger when the integrated charger is included as part of the primary ECS.

Primary ECS 501 operates with high voltages at a frequency that is greater than 60 Hertz (Hz). Secondary ECS 502 operates at a frequency of 60 Hz or less. A first frequency of a first electrical current input along signal path 505 to controller/convertor 527 of primary ECS 501 has a greater frequency value than a second frequency of a second electrical current carried on output 523 from secondary system 502 to integrated charger 553. An electrical signal output from integrated charger 553 is received by transfer switch 503. Controller/convertor 527 may measure voltage, current and power similar to the embodiment of FIG. 4. Wireless signal paths 519, 521 transmit data to ensure ECS 501 operates at optimal system power efficiency. Signal path 509 operates the state of transfer switch 503. An extension of the alignment means presented in the embodiment of FIG. 4 may be a secondary aligning means, such as a tennis ball 539, to further assist to position vehicle 516 so that transducers 524, 526 are in alignment so as to operationally perform the transfer of magnetic energy therebetween. Optimally, transducers 524, 526 may generally be in physical, axial alignment similar to the embodiment of FIG. 4. Alternately, the transducers may not be in axial alignment and the primary ECS may still effectively operate. Wireless signal paths 521 may also transmit sensor data as described in the embodiment of FIG. 9 to electrical devices disposed on vehicle 516. Vehicle data bus 511 transmits vehicular information, such as the current charging level of battery 514 to controller/convertor 527. Secondary system 502 provides a 60 Hertz (Hz) electrical charging option for a human operator of ECS 500 to advantageously provide further charging convenience for the human operator. Having a 60 Hz secondary system that may operate from a power source of 120 VAC and a greater than 60 Hz primary system that may operate from a power source of greater than 120 VAC provides different electrical charging options for the human operator that may be available dependent on where the vehicle is operated. One such secondary system is further described in U.S. Ser. No. 12/950,298 entitled "BATTERY CHARGER HAVING NON-CONTACT ELECTRICAL SWITCH" filed on 19 Nov. 2010 and incorporated by reference in its entirety herein.

Alternately, the ADD attached to the ground-based off-vehicle transducer may also discourage foreign objects, such as a soda pop can for example, from occupying a space overlying the ground-based off-vehicle transducer especially when the on-vehicle transducer overlies the off-vehicle transducer.

In another alternate embodiment, the posts may have non-flat ends. In one embodiment, for example, the ends may be concave rounded ends.

In a further alternate embodiment, the top external surface of the ground-based transducer may be any shape and size and the base of the ADD may be formed to conform to this shape and size.

In still another alternate embodiment, while the ADD is deployed on a transducer as part of an electrical charging system as described herein, the ADD may be deployed on any type of apparatus where animal deterrence is needed. Still yet alternately, the ADD may be used independently of any apparatus where animal deterrence is needed.

In yet another alternate embodiment, the overall size of the ADD along with the size of the array of animal deterring elements may be tailored to suit the apparatus that needs animal deterrence.

In a further alternate embodiment, any type of device or apparatus that needs animal deterrence, especially spatial animal deterrence in relation to another device, may find the ADD useful. The ADD may be mountable to any type of solid material.

Still alternately, the on-vehicle transducer may be deposed along any portion of the vehicle along the length L of the vehicle.

In yet another alternate embodiment, if the on-vehicle transducer is recessed above the lower level of the undercarriage, the additional space created thereat may be filled with a filling material such that animal deterrence is still effective with the ADD. The filling material, for example, may be formed of a plastic material or be a plastic panel that prevents the space from being occupied by the animal.

Thus, a robust ADD prevents animals and small objects from entering this space intermediate the transducers to enable maximum energy transfer efficiency between the transducers has been presented. The ADD may be formed out of a thermoplastic material in a mold in a single molding process operation as a single unitary piece. The ADD is easily installed on the off-vehicle transducer using fasteners or adhesive. The animal deterring elements have a sufficient height that allow the ADD attached to the off-vehicle transducer to be within tolerances of a ground clearance of the vehicle but discourage and prevent an animal's body from being located in a space disposed intermediate the ends of the animal deterring elements and the on-vehicle transducer when the ends of the animal deterring elements underlie the undercarriage of the vehicle. This animal deterrence is particularly effective when the spacing of the posts in the array in the x-direction are about the same spacing as in the y-direction and the distance of the spacing between the ends of the posts and an external surface of the on-vehicle transducer is about the same distance as the distance of the x-direction. The animal deterring elements have sufficient strength so as to protrude upward from the base of the ADD while being resilient enough to support ingress from an animal disposed thereon. The ADD may be formed for deployment on a single surface or multiple external surfaces of the off-vehicle transducer dependent on the animal deterrence area needed in an ECS application. When animal deterrent elements are disposed on multiple external surfaces, such as adjacent sidewalls of a square or rectangular off-vehicle transducer, the animal is discouraged from residing adjacent those sidewalls. The ADD may be equipped with sensors to sense movement or pressure from either a foreign object or an animal and communicate an electrical signal that the ECS receives and interprets so as stop the ECS from electrically charging the battery. The ECS may be further equipped and configured to resume electrical charging when the foreign object or animal condition has cleared. The animal deterring elements may have hollowed portions that allow sensors to be deployed therein while decreasing the amount of material needed to form the ADD which decreases manufacturing material costs. The ADD may be utilized in any ECS that has a ground-based transducer where animal deterrence is desired. In general, the ADD may be deployed with any type of apparatus where animal deterrence is needed and may be formed in a manner that allows deployment on many different apparatus shapes and sizes.

While this invention has been described in terms of the embodiments thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to one or more embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

I claim:

1. An animal deterrent device (ADD) for use with an electrical charging system (ECS) for electrically charging an energy storage device (ESD), said ECS including a first transducer being disposed on a ground surface and a second transducer configured to receive energy from the first transducer, said ADD comprising:
a generally non-yielding base configured for deployment on at least one external surface of the first transducer, said base including an array of animal deterring elements extending outwardly away therefrom.

2. The ADD according to claim 1, wherein the elements disposed in the array of animal deterring elements have a first distance one-to-another in a x-direction and a second distance one-to-another in a y-direction transverse to the x-direction, and said first distance and said second distance are generally parallel with said ground surface, and a third distance is defined between ends of the animal deterring elements in said array and at least one of an undercarriage of the vehicle and the second transducer disposed on said undercarriage when the undercarriage of the vehicle overlies the first transducer,
wherein when at least one of the undercarriage and the second transducer overlies at least a portion of the first transducer, said first distance is about the same distance as said second distance and said third distance is at least about the same distance as said first distance.

3. The ADD according to claim 1, wherein said ADD is formed as a single unitary piece.

4. The ADD according to claim 1, wherein the at least one external surface includes a top external surface that faces away from said ground surface, and said base overlies a majority portion of said top external surface.

5. The ADD according to claim 1, wherein the ADD is configured for attachment to said first transducer.

6. The ADD according to claim 1, wherein the base and the array of animal deterring elements, respectively, are formed from the same material.

7. The ADD according to claim 1, wherein said at least one external surface of the first transducer includes a plurality of external surfaces, and at least one animal deterrent element in the array of animal deterrent elements is disposed on said plurality of external surfaces, respectively.

8. The ADD according to claim 1, wherein a column strength of each animal deterring element in the array of animal deterring elements is sufficiently rigid to prevent ingress by at least one of a dog and a cat in combination with each animal deterring element in the array of animal deterring elements also being sufficiently resilient to prevent breakage thereto with said ingress by at least one of the dog and the cat.

9. The ADD according to claim 1, wherein the ECS comprises at least one sensor, and when the ADD is deployed on the first transducer, at least one animal deterring element in said array of animal deterring elements is in communication with said sensor such that when said sensor is activated, the ECS is configured to stop electrical charging of the ESD.

10. The ADD according to claim 9, wherein said ECS includes an apparatus that supplies power to the first transducer and said sensor is in electrical communication with said apparatus.

11. The ADD according to claim 1, wherein the second transducer is disposed on a vehicle and the ADD is disposed external to the vehicle.

* * * * *